(12) United States Patent
Waldo, IV et al.

(10) Patent No.: US 11,379,776 B2
(45) Date of Patent: *Jul. 5, 2022

(54) SYSTEM AND METHOD FOR VALIDATING DATA

(71) Applicant: Innovian Corporation, Bryan, TX (US)

(72) Inventors: Whitson G. Waldo, IV, Bryan, TX (US); Bill Bruno, Chicago, IL (US); Adam McArdell, Davenport, IA (US); Kevin Wysocki, Denver, CO (US)

(73) Assignee: Innovian Corporation, Bryan, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/201,387

(22) Filed: Mar. 15, 2021

(65) Prior Publication Data
US 2021/0224704 A1    Jul. 22, 2021

Related U.S. Application Data

(63) Continuation-in-part of application No. 15/221,414, filed on Jul. 27, 2016, now Pat. No. 10,977,597.
(Continued)

(51) Int. Cl.
*G06Q 10/06* (2012.01)
*G06N 20/00* (2019.01)
*G06F 16/23* (2019.01)

(52) U.S. Cl.
CPC ..... *G06Q 10/0637* (2013.01); *G06F 16/2365* (2019.01); *G06N 20/00* (2019.01)

(58) Field of Classification Search
None
See application file for complete search history.

(56) References Cited

U.S. PATENT DOCUMENTS 5,740,354 A * 4/1998 Ben-Natan ............ G06F 11/079
                                                            714/45
5,790,779 A * 8/1998 Ben-Natan .......... G06F 11/0775
                                                            714/39
(Continued)

FOREIGN PATENT DOCUMENTS

WO   WO-2004079544 A2 *  9/2004  ........... G06F 16/954
WO   WO-2009051939 A2 *  4/2009  ........... G06F 16/958
WO   WO-2014159899 A2 * 10/2014  ............ G06F 16/95

OTHER PUBLICATIONS

Ndichu, Samuel, Sangwook Kim, and Seiichi Ozawa. "Deobfuscation, unpacking, and decoding of obfuscated malicious JavaScript for machine learning models detection performance improvement." CAAI Transactions on Intelligence Technology 5.3 (2020): 184-192. (Year: 2020).*

(Continued)

*Primary Examiner* — Brian M Epstein
*Assistant Examiner* — Derick J Holzmacher
(74) *Attorney, Agent, or Firm* — Houda El-Jarrah; Bold IP, PLLC

(57) ABSTRACT

A system for validating data includes a digital touch point associated with an organization having an element and a quality assurance (QA) module for monitoring the digital touch point. The system includes a quality control (QC) algorithm associated with the QA module, which is executed against the new element to determine if one or more discrepancies exist between current data for the new element and expected data for the new element. The system includes a tangible error report that captures one or more discrepancies between the current data and the expected data for the new element. The QA module has the ability to modify the request to call to eliminate the one or more discrepancies.

13 Claims, 12 Drawing Sheets

Related U.S. Application Data

(60) Provisional application No. 62/197,439, filed on Jul. 27, 2015.

(56) References Cited

U.S. PATENT DOCUMENTS

| | | | | |
|---|---|---|---|---|
| 7,725,574 B2* | 5/2010 | O'Connell | G06F 11/0781 | 709/224 |
| 7,861,213 B2* | 12/2010 | Wang | G06F 9/451 | 717/100 |
| 7,890,814 B2* | 2/2011 | Zhang | G06F 11/366 | 714/48 |
| 8,161,498 B2* | 4/2012 | Atkin | G06F 9/454 | 717/118 |
| 8,578,482 B1* | 11/2013 | Yang | G06F 21/51 | 726/22 |
| 8,706,871 B2* | 4/2014 | Wiener | G06F 40/14 | 709/224 |
| 8,874,970 B2* | 10/2014 | Benedek | G06F 11/079 | 714/38.11 |
| 9,003,423 B1* | 4/2015 | Rodriguez Valadez | G06F 9/54 | 719/310 |
| 9,015,832 B1* | 4/2015 | Lachwani | H04L 63/1408 | 726/22 |
| 9,064,028 B2* | 6/2015 | Shen | H04L 67/28 | |
| 10,474,887 B2* | 11/2019 | Levin | G06K 9/00449 | |
| 2001/0032248 A1* | 10/2001 | Krafchin | G06Q 10/107 | 709/206 |
| 2004/0107387 A1* | 6/2004 | Larsson | G06F 11/0775 | 714/39 |
| 2007/0174419 A1* | 7/2007 | O'Connell | G06F 11/0781 | 709/217 |
| 2008/0034404 A1* | 2/2008 | Pereira | H04L 63/12 | 726/2 |
| 2008/0126869 A1* | 5/2008 | Kraft | G06F 21/55 | 714/37 |
| 2008/0155340 A1* | 6/2008 | Tsun | G06F 11/3664 | 714/38.14 |
| 2008/0320343 A1* | 12/2008 | Eickmeyer | G06F 11/3676 | 714/57 |
| 2009/0006883 A1* | 1/2009 | Zhang | G06F 11/366 | 714/1 |
| 2009/0094175 A1* | 4/2009 | Provos | G06N 20/00 | 726/22 |
| 2009/0100154 A1* | 4/2009 | Stevenson | G06Q 30/02 | 709/220 |
| 2009/0327865 A1* | 12/2009 | Li | G06F 16/00 | 715/234 |
| 2010/0218053 A1* | 8/2010 | Eickmeyer | G06F 11/0748 | 714/57 |
| 2011/0035486 A1* | 2/2011 | Seolas | G06F 16/957 | 709/224 |
| 2011/0041090 A1* | 2/2011 | Seolas | G06F 11/3688 | 709/224 |
| 2011/0066908 A1* | 3/2011 | Bartz | H04L 41/0631 | 714/E11.01 |
| 2011/0119220 A1* | 5/2011 | Seolas | G06F 11/3608 | 706/47 |
| 2011/0173698 A1* | 7/2011 | Polyakov | G06F 11/0748 | 726/23 |
| 2011/0276843 A1* | 11/2011 | Echevarria | G06F 11/0781 | 714/55 |
| 2012/0204068 A1* | 8/2012 | Ye | G06F 11/0769 | 714/57 |
| 2013/0055042 A1* | 2/2013 | Al Za'Noun | G06Q 10/06395 | 714/E11.023 |
| 2013/0083996 A1* | 4/2013 | Prasad | G06K 9/6263 | 382/159 |
| 2014/0052821 A1* | 2/2014 | Prasad | G06F 16/9577 | 709/218 |
| 2014/0059219 A1* | 2/2014 | Seolas | G06F 16/957 | 709/224 |
| 2014/0136944 A1* | 5/2014 | Harris | G06F 16/958 | 715/234 |
| 2014/0189864 A1* | 7/2014 | Wang | G06F 21/566 | 726/23 |
| 2014/0280012 A1* | 9/2014 | Feuerlein | G06F 16/986 | 707/709 |
| 2014/0281902 A1* | 9/2014 | Feuerlein | H04L 67/01 | 715/234 |
| 2014/0283041 A1* | 9/2014 | Cao | G06F 21/563 | 726/22 |
| 2014/0317489 A1* | 10/2014 | Lal | G06F 40/14 | 715/234 |
| 2014/0344232 A1* | 11/2014 | Kludy | G06F 40/174 | 707/694 |
| 2015/0095721 A1* | 4/2015 | Beskrovny | G06F 16/9577 | 714/48 |
| 2015/0128263 A1* | 5/2015 | Raugas | H04L 63/1433 | 726/23 |
| 2015/0193402 A1* | 7/2015 | Ayoub | G06F 40/143 | 715/234 |
| 2016/0078078 A1* | 3/2016 | Seolas | G06F 16/78 | 707/687 |
| 2016/0080345 A1* | 3/2016 | Safruti | H04L 67/02 | 726/6 |
| 2017/0032305 A1* | 2/2017 | Bruno | G06Q 10/06395 | |
| 2017/0230258 A1* | 8/2017 | Pestana | H04L 43/062 | |
| 2018/0196785 A1* | 7/2018 | Levin | G06K 9/00463 | |
| 2018/0198807 A1* | 7/2018 | Johns | H04L 63/1416 | |
| 2019/0235744 A1* | 8/2019 | Burpulis | G06F 3/04842 | |
| 2020/0249964 A1* | 8/2020 | Fernandes | G06F 11/3409 | |
| 2020/0356466 A1* | 11/2020 | Thangam | G06F 11/3692 | |
| 2020/0401382 A1* | 12/2020 | Briggs | G06N 5/04 | |
| 2021/0142258 A1* | 5/2021 | Noivo | G06F 11/3664 | |

OTHER PUBLICATIONS

Likarish, Peter, Eunjin Jung, and Insoon Jo. "Obfuscated malicious javascript detection using classification techniques." 2009 4th International Conference on Malicious and Unwanted Software (MALWARE). IEEE, 2009. (Year: 2009).*

Balasundaram, Prabavathy, Amrita Ramadoss, and Manju Muthaiya. "IE browser compatibility for web applications." ACM SIGWEB Newsletter Autumn (2012): 1-15. (Year: 2012).*

* cited by examiner

Example Report 1: Data Layer Errors

| Invalid Value | Data Layer Variable | Data Layer Errors | Sessions Impacted | Tags Impacted |
|---|---|---|---|---|
| Incorrect case | affinity_group | 989 | 972 | 1 |
| | page_name | 754 | 743 | 1 |
| | store_locator_country | 677 | 670 | 1 |
| Incorrect format | coupon_id | 3,421 | 3,361 | 3 |
| | rewards_member | 1,132 | 1,130 | 1 |
| | store_locator_results_returned | 1,995 | 1,872 | 1 |
| | store_locator_state | 2,003 | 1,992 | 1 |
| Missing Product ID | product_filters | 1,083 | 1,077 | 1 |
| | products_in_cart | 1,316 | 1,293 | 2 |
| No Value | banner_ad_name | 7 | 3 | 1 |
| | site_section | 690 | 663 | 1 |
| | store_locator_zip | 456 | 421 | 1 |
| | user_id | 1,089 | 1,074 | 1 |

FIG. 3A

Example Report 2: Data Layer Errors by Page URL

| Page URL | Data layer variable | Data layer errors | Sessions impacted | Tags impacted |
|---|---|---|---|---|
| www.samplesite.com/bath | site_section | 690 | 663 | 1 |
| www.samplesite.com/checkout/my-cart | coupon_id | 3,421 | 3,361 | 3 |
| | products_in_cart | 1,316 | 1,293 | 2 |
| www.samplesite.com/home | banner_ad_name | 7 | 3 | 1 |
| | rewards_member | 1,132 | 1,130 | 1 |
| www.samplesite.com/kitchen/cookware/pans | page_name | 754 | 743 | 1 |
| www.samplesite.com/kitchen/mixers/hand-mixers | product_filters | 1,083 | 1,077 | 1 |
| www.samplesite.com/log-in | user_id | 1,089 | 1,074 | 1 |
| www.samplesite.com/myaccount/user-preferences | affinity_group | 989 | 972 | 1 |
| www.samplesite.com/store-locator | store_locator_country | 677 | 670 | 1 |
| | store_locator_results_returned | 1,995 | 1,872 | 1 |
| | store_locator_state | 2,003 | 1,992 | 1 |
| | store_locator_zip | 456 | 421 | 1 |

FIG. 3B

Example Report 3: Tags Impacted

| Tag Name | Data Layer Variable | Tags Impacted | Sessions Impacted |
|---|---|---|---|
| Adobe Analytics | coupon_id | 1 | 362 |
|  | products_filters | 1 | 1,077 |
|  | products_in_cart | 1 | 521 |
|  | store_locator_country | 1 | 670 |
|  | store_locator_results_returned | 1 | 1,872 |
|  | store_locator_state | 1 | 1,992 |
|  | store_locator_zip | 1 | 421 |
| ComScore | page_name | 1 | 743 |
|  | user_id | 1 | 1,074 |
| DoubleClick | banner_ad_name | 1 | 3 |
| Googling Analytics | affinity_group | 1 | 972 |
|  | coupon_id | 1 | 2,009 |
|  | rewards_member | 1 | 1,130 |
|  | site_section | 1 | 663 |
| Qualroo | coupon_id | 1 | 990 |
|  | products_in_cart | 1 | 772 |

FIG. 3C

Example Report 4: Tags Impacted by Page

| Tag Name | Page URL | Tags Impacted | Sessions Impacted |
|---|---|---|---|
| Adobe Analytics | www.samplesite.com/checkout/my-cart | 2 | 883 |
| | www.samplesite.com/kitchen/mixers/hand-mixers | 1 | 1,077 |
| | www.samplesite.com/store-locator | 4 | 4,955 |
| ComScore | www.samplesite.com/kitchen/cookware/pans | 1 | 743 |
| | www.samplesite.com/log-in | 1 | 1,074 |
| DoubleClick | www.samplesite.com/home | 1 | 3 |
| Google Analytics | www.samplesite.com/bath | 1 | 663 |
| | www.samplesite.com/checkout/my-cart | 1 | 2,009 |
| | www.samplesite.com/home | 1 | 1,130 |
| | www.samplesite.com/myaccount/user-preferences | 1 | 972 |
| Qualroo | www.samplesite.com/checkout/my-cart | 2 | 1,762 |

FIG. 3D

Example Report 5: Tags Blocked

| Tag Name | Tag Blocked# | Sessions Impacted |
| --- | --- | --- |
| Adobe Analytics | 7 | 6,915 |
| Google Analytics | 4 | 4,774 |
| ComScore | 2 | 1,817 |
| Quairoo | 2 | 1,762 |
| DoubleClick | 1 | 3 |

FIG. 3E

Example Report 6: Tags Blocked by Page

| Tag Name | page URL | Tag Blocked # | Sessions Impacted |
|---|---|---|---|
| Adobe Analytics | www.samplesite.com/checkout/my-cart | 2 | 883 |
| | www.samplesite.com/store-locator | 4 | 4,955 |
| | www.samplesite.com/kitchen/mixers/hand-mixers | 1 | 1,077 |
| ComScore | www.samplesite.com/kitchen/cookware/pans | 1 | 743 |
| | www.samplesite.com/log-in | 1 | 1,074 |
| DoubleClick | www.samplesite.com/home | 1 | 3 |
| Google Analytics | www.samplesite.com/checkout/my-cart | 1 | 2,009 |
| | www.samplesite.com/home | 1 | 1,130 |
| | www.samplesite.com/bath | 1 | 663 |
| | www.samplesite.com/myaccount/user-preferences | 1 | 972 |
| Qualroo | www.samplesite.com/checkout/my-cart | 2 | 1,762 |

FIG. 3F

SYSTEM AND METHOD FOR VALIDATING DATA

CROSS-REFERENCE TO RELATED APPLICATIONS

This application is a continuation in part application which claims priority to U.S. Non-Provisional patent application Ser. No. 15/221,414, which was filed on Jul. 27, 2016, which claims the benefit of and priority to U.S. Provisional Patent Application Ser. No. 62/197,439, filed Jul. 27, 2015, which are incorporated by reference in their entirety.

FIELD OF THE DISCLOSURE

The present disclosure generally relates to a system and method for validating data.

BACKGROUND

In the digital space, organizations use a variety of technologies to track a consumer's movements as the consumer interacts with any of the digital touch points the organization may have (e.g., website, mobile application, mobile site, etc.). When a consumer arrives at a digital touch point for an organization such as a web site the consumer is given a cookie, which stays with the consumer as he or she explores the various pages or layers of the digital touch point. There are a variety of JavaScript tags that may be deployed throughout the digital channel to capture information about the consumer and send that information to the organization or a third party to process the collected data and turn the data into reports. The types of consumer data that may be collected includes: Data from the Document Object Module (DOM), Visitor provided information (name, email address, etc.), Behavioral data (web pages viewed, applications interacted with, links clicked, etc.), Purchase data (items placed in cart, items purchased, etc.), and Campaign interactions (consumer came to website from email, by clicking on an ad on a third party website, etc.).

Deploying JavaScript tags properly so that accurate consumer information is captured and sent to the relevant party for processing requires a great amount of skill. Largely, this is a manual process completed by external consultants, internal IT teams, or a combination of the two. Most deployment implementations end up having faults due to human error as a high level of attention to detail is required to accurately adjust the JavaScript tags for each page or section of the digital touchpoint. As a result, organizations spend large amounts of time and money on auditing and validating implementations. Further, once the data is processed and a report generated there is often a considerable amount of time that is spent questioning the accuracy of the data or explaining why discrepancies exist.

When accurately collected, consumer data becomes inherently valuable to an organization and many business decisions are made based on the insights generated from the data. However, with all of the complications in the initial deployment implementation, maintaining that implementation over time can become a very burdensome process.

The massive scale of how much data is being processed at increasingly granular time scales for many companies and organizations and the voluminous analysis necessary in order for the consumer and company data to have an accurate reflection of how a website or another digital touchpoint is behaving is increasingly beyond the abilities of any one single person or even an army of people to keep up with. Whether the digital touchpoint is in the form of a website accessible over the internet that is used by people to buy products online or through smart devices or a network of data sources related to business and company operations and output, data and the insights derived from this data fuel a huge percentage of what drives the economy. However, this creates a whole host of issues because the massive scale and never-ending stream of data means that humans cannot keep up with manually monitoring each and every interaction.

These days, almost every company uses different methods to collect customer or consumer data. From customer surveys to Google Analytics—several tools are being used to capture data. It is understood that the modern world is highly digitalized with almost every system being implemented over an external or internal network that relies on the correct and proper functioning of an entity's systems and machines. As a result, making important decisions around financial transactions, marketing to businesses and consumers, detecting fraud, enhancing the customer experience—all can be influenced and driven by businesses' ability to learn from such data and optimize their critical actions based on such data-driven insights. If an entity conducts its business online and tries to make people aware of its presence, the business must be very aware of the digital footprint it has and analyze what type of consumer and company data is being generated from its digital sources and how accurate this data is. Further, even if an entity is not directly consumer facing, the entity still benefits from analyzing any data related to its models and systems of operation for any goods or services provided and detecting any anomalies or errors being generated from its models and systems.

Therefore, there still exists a need to consistently validate data being collected, whether the data is provided for internal review and sent to an organization or entity or to third parties for processing or analysis.

SUMMARY

In an embodiment, a system may configure a specialized user computing device to validate data of a website or other digital touch point as herein described. The system may include a digital touch point associated with an organization, the digital touch point may include an element. The system may also include a quality assurance (QA) module for monitoring the digital touch point. The QA module may send a request to call if a new element is detected at the digital touch point. The system may also include a quality control (QC) algorithm associated with the QA module. The QC algorithm may receive the new element in response to the request to call and may be executed against the new element to determine if one or more discrepancies exist between current data for the new element and expected data for the new element. A tangible error report may then be generated by the QA module in response to the QC algorithm determining that discrepancies exist between current data for the new element and expected data for the new element. The error report may capture the one or more discrepancies between the current data and the data expected for the new element and the QA module may have the ability to modify the request to call to eliminate the one or more discrepancies.

In another embodiment, a tangible method may configure a specialized user computing device to validate data. The method may monitor a digital touch point, wherein the digital touch point has an element. The method may also detect the creation of a new element on the digital touch point and execute an algorithm against the new element to determine if one or more discrepancies exist between current data for the new element and expected data for the new element. A tangible error report may then be generated by the QA module in response to the QC algorithm determining that discrepancies exist between current data for the new element and expected data for the new element. The error report may capture the one or more discrepancies between the current data and the data expected for the new element and the QA module may have the ability to modify the request to call to eliminate the one or more discrepancies.

In another embodiment, a tangible method may configure a specialized user computing device to validate data. The method may monitor a digital touch point, wherein the digital touch point has an element. The method may also detect the creation of a new element on the digital touch point and execute an algorithm against the new element to determine if data associated with the new element corresponds to data expected for the element. In response to a negative determination, the method may also capture one or more discrepancies between the data associated with the element and the data expected for the element in an error report and communicate the error report to a reporting system.

The features and advantages described in this summary and the following detailed description are not all-inclusive. Many additional features and advantages will be apparent to one of ordinary skill in the art in view of the drawings, specification, and claims thereof.

BRIEF DESCRIPTION OF THE DRAWINGS

The invention may be better understood by reference to the detailed description when considered in connection with the accompanying drawings. The components in the figures are not necessarily to scale, emphasis instead being placed upon illustrating the principles of the invention. In the figures, like reference numerals designate corresponding parts throughout the different views.

FIG. 3A illustrates an example error report that may be generated by the system;

FIG. 3B illustrates an example error report that may be generated by the system;

FIG. 3C illustrates an example error report that may be generated by the system;

FIG. 3D illustrates an example error report that may be generated by the system;

FIG. 3E illustrates an example error report that may be generated by the system;

FIG. 3F illustrates example error report that may be generated by the system.

Figure 1:
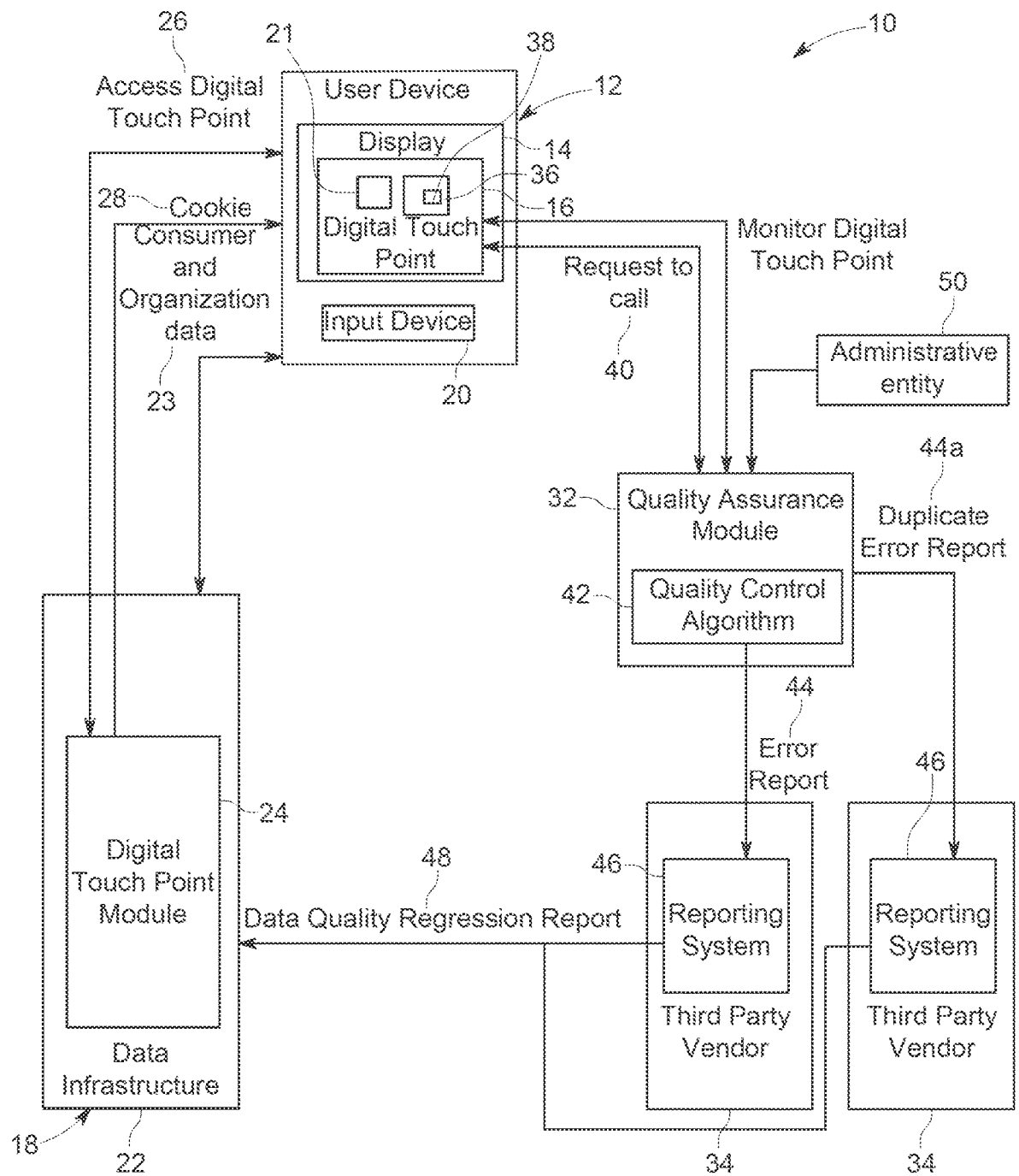
FIG. 1 is a schematic of an embodiment of a system for validating data where a reporting system is hosted by multiple third party vendors.

Persons of ordinary skill in the art will appreciate that elements in the figures are illustrated for simplicity and clarity so not all connections and options have been shown to avoid obscuring the inventive aspects. For example, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein are to be defined with respect to their corresponding respective areas of inquiry and study except where specific meanings have otherwise been set forth herein.

DETAILED DESCRIPTION

The present invention now will be described more fully with reference to the accompanying drawings, which form a part hereof, and which show by way of illustration, specific exemplary embodiments by which the invention may be practiced. These illustrations and exemplary embodiments are presented with the understanding that the present disclosure is an exemplification of the principles of one or more inventions and is not intended to limit any one of the inventions to the embodiments illustrated. The invention may be embodiment in many different forms and should not be construed as limited to the embodiments set forth herein; rather, these embodiments are provided so that this disclosure will be thorough and complete, and will fully convey the scope of the invention to those skilled in the art. The following detailed description is, therefore, not to be taken in a limiting sense.

As used herein, the terms first, second, third, and the like are used to distinguish between similar elements and not necessarily for describing a specific sequential or chronological order. The terms are interchangeable under appropriate circumstances and the embodiments of the invention can operate in other sequences than described or illustrated herein.

At a high level, the described system may be useful to configure a user computing device to determine whether elements of a computer based display or a computer based system over an extended network (whether internal or external) are corrupt and/or malicious. Further, the system may be used to detect any type of anomaly or discrepancies whether the elements are corrupt or malicious. As users become more and more dependent of computer displays of data, there is more opportunity for unwanted data to be inserted into a display where the unwanted data may be dangerous to a computing device. An algorithm may configure a specialized user computing device using the received data. For example, the algorithm may tune the specialized user computing device to a measure the risk of a data element and if the risk is over a threshold, the specialized user computing device may not display the data or may add the data or a representation of the data to a report.

Figure 1A:
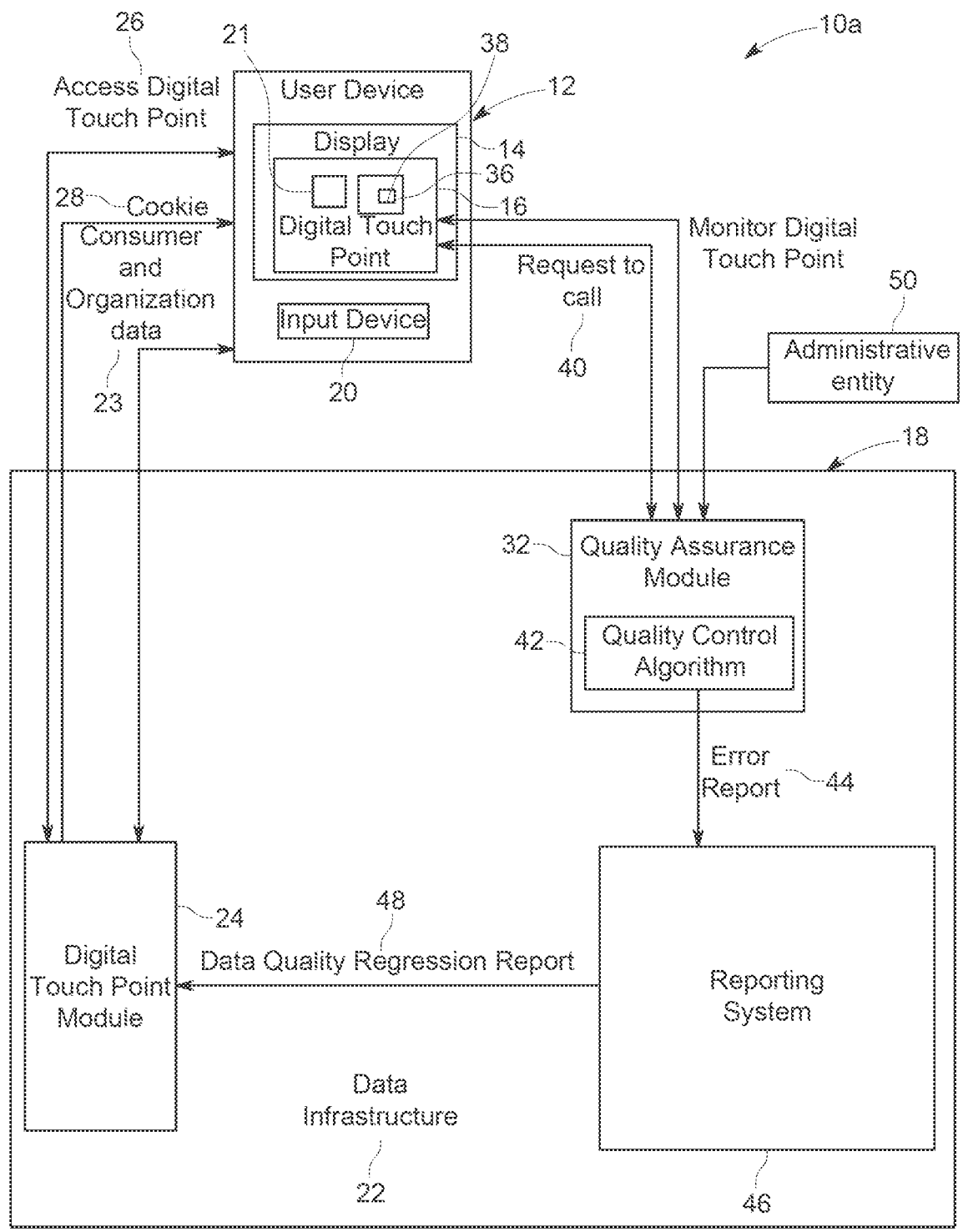
FIG. 1A is a schematic of an embodiment of the system of FIG. 1 where the reporting system is hosted within an organization.

Turning to the figures, FIGS. 1 and 1A show a system 10 and 10a, respectively, for validating data. The systems 10 and 10a may include a specialized user computing device 12 that has a display 14 for viewing a digital touch point 16 of an organization 18 and an input device 20 for interacting with the digital touch point 16. The term "organization" as used herein may refer to any type of company, business, or other entity, including commercial entities, academic entities, for profit ventures, non-profit ventures, government type agencies, or any other type of agency or establishment without limitation.

The specialized user computing device 12 may be a mobile device such as a smart phone, laptop, or tablet, a computer, or any other computing device that has an internal processor and digital display. The digital touch point 16 may be a web site, mobile application, mobile site, graphical user interface or any other manner by which the organizations 18 presents information to a user digitally using the specialized user computing device 12. The digital touch point 16 may also include one or more elements 21 having data associated therewith. The elements 21 may be digital content that is digitally presented on the specialized user computing device 12. The elements 21 may be created in any appropriate computer language such as a Hypertext Markup Language (HTML) or AJAX or Flash or any other coding principle for the digital channel. The input device 20 may be a keyboard, mouse, a touch screen, or any other input device that enables a consumer to browse and interact with the digital touch point 16.

The system 10 may also include data infrastructure 22, which is associated with the organization 18 to control data used in the system 10. The data infrastructure 22 may include one or more servers, processors, and/or modules to process and store data, reports, and/or communicate various requests for data, such as a request for consumer and organization data 23. The data infrastructure 22 may be spread out over a plurality of processors, such as in computers that are part of a network or part of a cloud computing environment. The requests may be created and implemented in a language such as JavaScript or WebAssembly or any other client-side language.

The data infrastructure 22 may include a digital touch point module 24, which may be used to create and control the display of the digital touch point 16. The digital touch point module 24 may communicate the digital touch point 16 to the specialized user computing device 12 in response to a request 26 to access the digital touch point 16 from the specialized user computing device 12. If a consumer provides sufficient permissions, the digital touch point module 24 may deploy one or more cookies 28 when the consumer uses the specialized user computing device 12 to communicate the request 26 to access the digital touch point 16. The digital touch point module 24 may communicate one or more requests for consumer and organization data 23 and receive data in response. The digital touch point module 24 may also receive and process data from third party vendors 34.

Third party vendors 34 may offer services in collecting, presenting, and analyzing consumer and organization data 23 from the digital touch point 16. In some cases, when digital touch point 16 is a website, the third party vendor 34 may provide web analytics services via one or more algorithms. Some non-limiting examples of third party vendors 34 include GOOGLE ANALYTICS and ADOBE ANALYTICS Third party vendors 34 may frequently make outbound data requests from the digital touch point 16 in order to perform their analytical and reporting services.

These web analytics services offered by third party vendors 34 may track and provide various displays (reports with charts, images, tables, or other types of displays) of information about the digital touch point 16, including, but not limited to information related to and derived from website traffic. Typically, these third party vendors 34 may use tracking code on each user computing device 12 in the browser or other applications used to interact with the digital touch point 16. The tracking code from the third party vendor 34 may try to collect information such as but not limited to whether the user or visitor had been to the digital touch point 16 (e.g., website) before (e.g., is the user a new or returning visitor?), the timestamp of the current visit, and the referrer site or campaign that directed the visitor to the digital touch point 16 (i.e., website). Currently, third party vendors 34 frequently collect inaccurate consumer and organization data 23 that is flawed or erroneous when they make outbound data requests or receive data from the digital touchpoint 16, but do not have a way of correcting this information. Accordingly, the third party vendors 34 incorporate the errors and anomalies in their analysis and presentation of information about a user's experiences with the digital point 16 and return their analysis back to the organization 18 based on such flawed consumer and organization data 23.

The system 10 may include a quality assurance (QA) module 32. The QA module 32 may be associated with the organization 18 as shown in FIG. 1 and FIG. 1A. The QA module may contain one or more algorithms to identify/correct data quality issues with the client-side data collection modules. The QA module 32 may actively monitor the digital touch point 16 for the creation of new elements 36 on the digital touch point 16. The new elements 36 may be additional digital content components written in HTML, Flash, AJAX, JavaScript, WebAssembly or other coding language Each new element 36 may also have current data 38 associated therewith. The current data 38 of each new element 36 may include: data from the document object module (DOM); visitor provided information (name, email address, etc.); behavioral data (data indicating web pages viewed; applications interacted with, links clicked, etc.); purchase data (data indicating items placed in cart, items purchased, etc.); campaign interactions (data indicating that the consumer came to the website from email, by clicking on an ad on a third party website, etc.); or other types of consumer data as described herein.

In one non-limiting embodiment, the QA module 32 and QC algorithm monitors tags associated with the digital touch point 16. Namely, the QA module 32 and QC algorithm monitors emitted tags to ensure that good quality and accurate consumer and organization data 23 is returned to the organization 18 as captured either in a report 44 sent to a number of reporting systems (e.g., such as a third-party vendor 34 offering a web analytics service or program like GOOGLE ANALYTICS or ADOBE ANALYTICS, a first-party data collection system or others such as data collection systems managed by the administrative entity 50). Accordingly, the QA module 32 and QC algorithm is executed in order to detect and/or modify errors, anomalies, and discrepancies with the consumer and organization data 23 before, during and after any tracking code embedded in the digital touch point 16 by a third party vendor 34 collects the consumer and organization data 23 and before this data is egressed or emitted to the third party vendor 34 (or back to the organization 18 for analysis also or other reporting systems managed by the administrative entity 50).

If one or more new elements 36 are detected, the QA module 32 may execute quality control (QC) algorithm 42 using the new element 36. The QC algorithm 42 may compare the current data 38 for the new element 36 with data expected for the element. The QC algorithm 42 may be customized based upon one or more inputs provided by the organization; namely, critical sections of the organization's digital presence, the types of information being collected about the user, and a prioritization of error types in the element data based upon the organization's most critical information. The QC algorithm 42 will then watch for specific instances of quality degradation in the element data and will repair (if possible) prior to the element data being sent to the third party vendor 34 and/or add the error to a report 44 (see, for example, FIGS. 3A-3F) for the organization's IT team or external consultants to remedy in a prioritized manner.

For example and not limitation, JPEG image files may be expected to have certain properties and a specific format, some metadata in known file locations, but JPEGs typically do not include executable instructions. Similarly, PNG image file format may also have certain properties and a specific format that is different from a JPEG image file, some metadata in known file locations, and no executable code. Thus, for example, if a JPEG file image is newly created on the digital touch point 16, but has the format of a PNG file image, the QA module will execute the algorithm 42 against the newly created JPEG image, compare the current data for the JPEG image (i.e., the PNG format) to the data expected for the JPEG image (i.e., JPEG format), and add the error to the error report 44 or, if possible, repair the current data (i.e., change the format from PNG to JPEG) of the newly created JPEG image in real time before adding it to the error report 44.

For another example and not limitation, e-commerce websites routinely gather information about customer journeys before, throughout and at the conclusion of a sales transaction to enable remarketing, post-sales support and identify opportunities for process optimization. There are several values that would be of interest to capture during a checkout process such as the identifiers of the products in the cart, their respective quantities and the price at which each being sold for. If this data is incorrectly populated in the data sent to the reporting systems, it will have an impact in the accuracy of any downstream data processing. A quantity could be incorrectly displayed as a negative, a currency presented with its currency symbol attached instead of a purely numerical value, or the item ID may fail to capture and is represented instead by a blank value. In each example, the QA module 32 would execute the QA algorithm 42 against the value and compare the current value against the expected representation. Each would result in an error being reflected in the error report 44, and if possible, would each be modified to conform to their expected forms, whereby the modification may include removal of the negative sign, the currency symbol removed and a lookup performed to retrieve and populate the intended item ID, respectively with such actions being reflected in the error report 44, as applicable.

Figure 5:
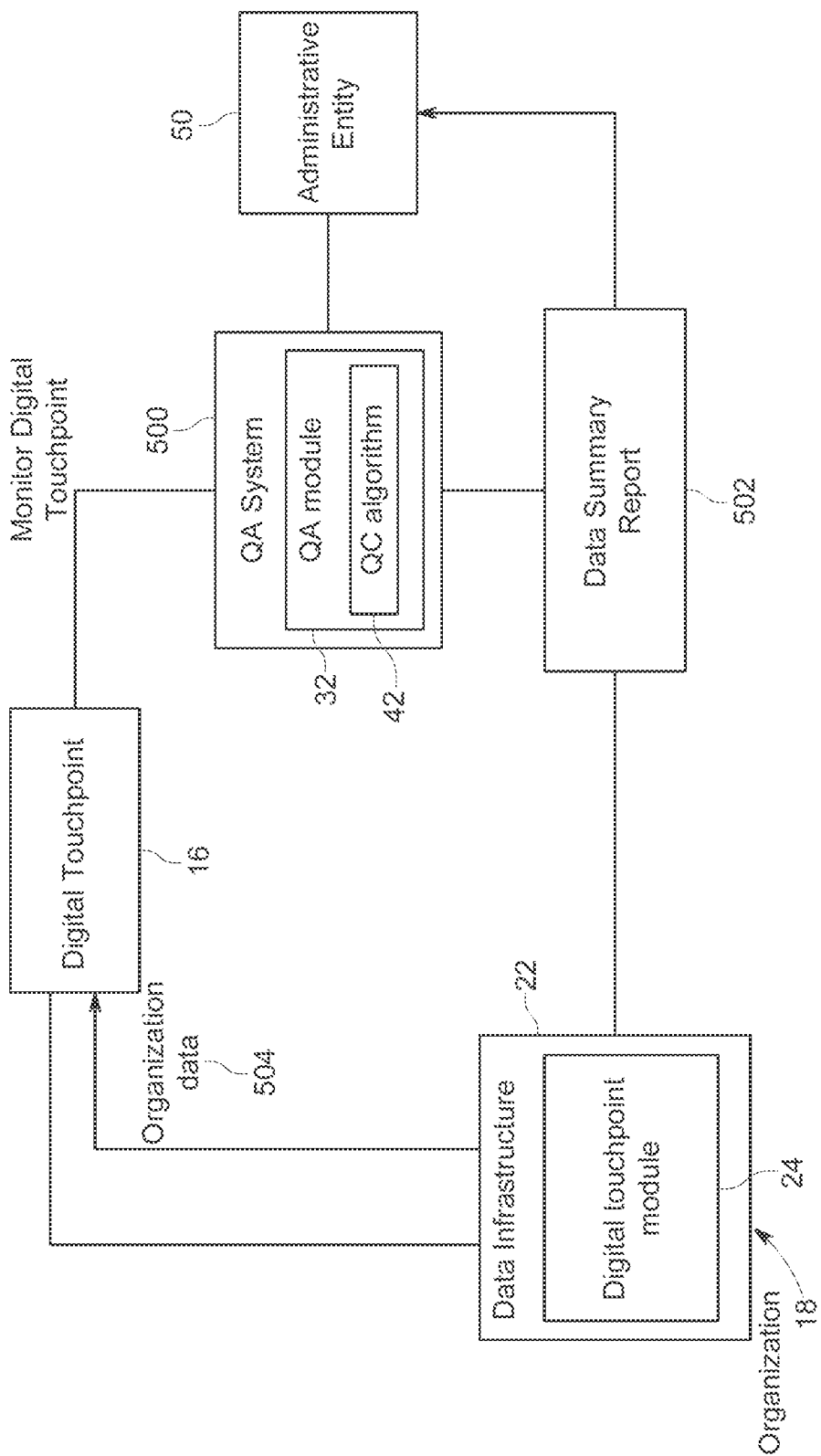
FIG. 5 illustrates a schematic of another embodiment of the system shown in FIG. 1.

For another example, and not limitation, the goods stored in a warehouse may be particularly sensitive to moisture, necessitating the installation of sensors 16 (whereby sensors may be an example of a digital touch point 16) that consistently report humidity back to a centralized system 50, as shown in FIG. 5. Over time, it is possible that a sensor 16 may quit functioning property and report ill-formed, non-numeric values back to the centralized system 50, as shown in FIG. 5, which may be unable to properly sanitize and process the unexpected data. As such, the QA system 500 would be installed such that data from the sensors 16 would first be evaluated by the QC algorithm 42. If the values represented numerical values, the values would be emitted back to the centralized system 50 for standard processing, but if the values failed to meet the expected format, a data summary report 502, as shown in FIG. 5, would be generated and emitted to the administrative entity 50 and alternative information passed to the organization 18 and the centralized system for the organization 18 to indicate a sensor fault.

It is noted that in one or more non-limiting embodiments, the QA algorithm 42 and QA module 32 does not necessarily have to detect a "new element 36" in order for the QA algorithm 42 and QA module 32 to be executed. Rather, the QA algorithm 42 and QA module 32 may solely act to monitor any tags or other data packets for anomalies, errors, or discrepancies and to report on such anomalies, errors, or discrepancies in a report 44 to either a third party vendor 34 and/or to the organization 18 and/or to the administrative entity 50. Further, the QA algorithm 42 and QA module 32 can modify and correct such anomalies, errors, or discrepancies.

Logically, the method and system may employ feedback to improve the algorithm 42. As an example, if the specialized user computing device 12 operates in an unexpected manner as a result of a file, the QC algorithm 42 may be updated to note that the elements 21 of similar files may be risky. Similarly, if the QC algorithm 42 configures the specialized user computing device 12 to mark the file as risky but further analysis reveals the file was not risky, the algorithm 42 may be updated to recognize the result.

Further, the method and system may be updated remotely from an authority. As malevolent users may be endlessly trying to be malicious, content and features on the digital touch point 16 may change over time. The system and method may periodically receive updates from an authority regarding new elements in a file (e.g., executable code in a PNG image file) that should be graded as being risky.

In particular, the system 10 may include an administrative entity 50, shown in FIG. 1 and FIG. 1A. The administrative entity 50 may be the provider and creator of an initial QC algorithm 42 and the QA module 32 and provide the QC algorithm 42 and QA module 32 in a form that is useful to the organization 18, which organization 18 may also amend the QC algorithm 42 and QA module 32 to introduce additional functionality, for monitoring the egress of data from the digital touch point 16 and, in some cases, the remediation and modification of data from the digital touch point 16. The administrative entity 50 has the authority to make any changes or updates to the format and programming of the QC algorithm 42 and the QA module 32. The administrative entity 50 and the organization 18 may create and then revise the QC algorithm 42 and QA module 32 periodically as needed in order to optimally detect any anomalies, errors, or discrepancies in the digital touchpoint 12.

For an example, and not limitation, a tax preparation company 504 may offer desktop- and web-based software allowing users to prepare and submit their annual tax returns from their own computers. A default implementation by the administrative entity 50 may automatically detect the presence of a user's social security number in egressed data, as this would typically not be collected intentionally. However, in this scenario, this company has a legitimate reason to ensure social security number capture for any data egressed to their own first-party data collection endpoint while still retaining a need to scrub this information in any data emitted to third-party vendors' data collection endpoints. As such, this organization 504 would proceed to modify the QA algorithm 42 and QA module 32 to best accommodate their specific configuration.

In some embodiments, the current data 38 may be given a numerical value based on the analysis of the QC algorithm 42. As an example, the element data in a file may have some suspect data or properties, which may be due to file degradation rather than being malicious and in such a case, the numerical value may be close but below a threshold. On the other hand, the element data of a file may contain data or properties, which are known to be malicious, and the file may receive a score well over a threshold.

The threshold may be a default, may be set by an authority or may be determined over time by the QC algorithm 42. If the threshold is too low, many files which are not risky may be flagged. Logically, if the threshold is too high, data errors that are new or well-hidden may slip through the system. The threshold may also be set through feedback where the system may watch how a specialized user computing device 12 responds to elements that were not flagged. For example, if the specialized user computing device 12 operates in an unexpected manner as a result of a file, the threshold may be lowered to catch more files. The system and method may periodically receive updates from an authority regarding the desired threshold setting.

If discrepancies exist between the current data 38 and the expected data for the element, a tangible error report 44 may be generated. If no errors are found, the report 44 may remain empty but may update in real-time to ensure completeness of the reporting. In addition, the algorithm 42 of the QA module 32 may modify the request to call 40 in real-time so that errors can be fixed immediately. The modification implemented by the request may include changing of one or more aspects of the new element 36, for example: information about the visit/session, data values for specific actions being completed on the website, and any other data as described herein (e.g., Data from the DOM); visitor provided information such as name, email address, etc.; behavioral data such as web pages viewed, applications interacted with, links clicked, etc.; purchase data such as items placed in a digital cart, items purchased, etc.; and campaign interactions such as an indication that a consumer came to the digital touch point from email, by clicking on an ad on a third party website, etc.). The modifications implemented by the request may also include creating a new element or deleting the element 36.

The tangible error report 44 generated by the QA module 32 may be sent to one or more reporting systems 46 where the error report 44 may be stored and analyzed. If there is more than one reporting system 46, then a duplicate error report 44a may be prepared and communicated to the additional reporting systems (see FIG. 1). FIG. 1A shows the example in which the reporting system is hosted within the organization 18. The error report 44 may also be stored on the organization's infrastructure or transmitted to a third-party system for the organization to access. The reporting system 46 may be hosted by the third-party vendor 34 (see FIG. 1), including a reporting system provided by the administrative entity 50 providing this data quality service or may be contained within the data infrastructure 22 of the organization 18 (see FIG. 1A)

The reporting system 46 may receive the tangible error report 44 generated by the QA module 32 and may also receive other information including information relating to new elements 36 without discrepancies. In some embodiments, the tangible error report 44 may include situations where the data was not correct or contained one of a multitude of error options. The reporting system 46 may include one or more servers/and or modules to analyze the error report 44 and other data received, and to prepare and communicate tangible reports. The reporting system 44 may prepare a data quality regression ("DQR") report 48 based on the error report 44 received as well as any other information received from the QA module 32. The DQR report 48 may then be sent to the organization 18.

The DQR report 48 may include information such as error types, the specific error, the prioritization of that error, and any other client-requested information that was incorporated into the customization of the algorithm 42 at installation. The organization 18 may use the DQR report 48 to identify errors automatically without any manual effort and ultimately put a plan in place to triage and remedy errors as they appear in the reports based on the algorithm's prioritization.

Several advantages are provided by the system 10 shown in FIG. 1 and FIG. 1A. In particular, the QC algorithm 42 and QA module 32 are embedded into the digital touch point 16 and run silently in the background as the user using his or her own user computing device 12 as a user browses and interacts with the digital touch point 16. The user computing device 12 may be the user's desktop, smartphone, tablet, or any other type of computing device without limitation thereto. The QC algorithm 42 and QA module 32 detects anomalies, errors, inadequately populated values, and discrepancies from what is expected in terms of data collected from the interaction of the user or another party with the digital touch point 16 as the user browses and interacts with the digital touch point 16 from their own computing device 12 and in some cases, can either delete detects anomalies, errors, and/or discrepancies or modify them or leave them as they are and just report them in a report 44 to either the third party vendor 34 or the organization 18 or both. Thus, in one non-limiting example, a rule is created for some element of the digital touch point 16 a by developer or programmer working with either the organization 18 or the administrative entity 50. The digital touch point 16 is accessed by a separate user using the user computing device 12 and the QC algorithm 42 and quality assurance module 32 are embedded and enabled to run in conjunction with the user's interaction with, browsing, or any action associated with the digital touch point 16. If an anomaly, error, or discrepancy is detected by the QC algorithm 42 and quality assurance module 32 such that the element on the digital touch point 16 does, or in the inverse, does not match the parameters of the rule, then a number of steps may occur. In one instance, the QC algorithm 42 may make note of the anomaly and include in the report 44 that can be returned to the administrative entity 50, organization 18, and/or third party vendor 34. In this case, the QC algorithm's 42 primary role is to detect the anomaly, error, or discrepancy and report its existence so remedial action can be made later on by the administrative entity 50 or organization 18.

In other instances, upon detecting the anomaly, error, or discrepancy, the QC algorithm 42 and QA module 32 may apply remedial code per the rule to correct the anomalous output and/or to delete the anomalous output, and then generate a report indicating what steps were taken and the anomalous output that was found and detected by the QC algorithm 42 and QA module 32. The administrative entity 50 and organization 18 may be notified of these corrections made by the remedial code upon receiving the report 44. Advantageously, the third party vendor 34 receives a report 44 reflecting accurate consumer and organization data 23 rather than inaccurate consumer and organization data 23. Because the organization 18 may be making very important decisions related to the management and functioning of its operations and the digital touch point 16 based on the feedback or services provided by the third party vendors 34, it is extremely critical that any data about the digital touch point 16 sent to the third party vendors 34 be as accurate and vetted as possible. Data that is accurately reported can be used to make important and valuable decisions with respect to the operation and management of organization 18, and/or the digital touch point 16, and the QC algorithm 42 and QC module 32 are tools to analyze the behavior of the organization's data on a digital touch point 16 and find actionable insights into the organization 18 and digital touch point 16 if there are anomalies, errors, or discrepancies. Further, the QC algorithm 42 and QC module 32 are scalable and customizable as needed.

Advantageously, the QC algorithm 42 and QC module 32 can monitor the digital touch point 16 and specifically the tags or other data packets embedded in the digital touch point 16 that send information about consumer and organization data 23 to either an organization 18 or third party vendor 34 or administrative entity 50. Further, advantageously, the QC algorithm 42 and AC module 32 can detect anomalies, errors, and discrepancies, and if allowed or structured to do so, make immediate corrections to the anomalies, errors, and discrepancies found in the monitored tags or other data packets so that the consumer and organization data 23 sent to the organization 18 and/or third party vendor 34 is accurate and valid. As noted above, if organization 18 has a website (i.e., digital touch point 16), there may be thousands and thousands of instances of reports collecting consumer and organization data 34 that is returned to organization 18 and/or a third party vendor 34 to analyze. The sheer scope of data is too much for any one person or a team of persons to sit and individually monitor every tag or other data packet for every user interaction with the digital touch point 16 and with every permutation of digital touch point 16 to make sure that there are no errors or discrepancies for each tag or other data packet for every type of consumer and organization data 34 that the organization 18 cares to know about and be aware of, let alone, for that one person or team of people to then correct before sending back to the organization 18 and/or third party vendor 34.

It is noted that in some non-limiting embodiments, the administrative entity 50 uses a remote control server to run the quality control algorithm 42 in the background of the digital touch point 16 as the user interacts with the digital touch point 16, whereby the QC algorithm 42 is compiled and served by the remote control server. In some cases, the QC algorithm 42 may be executed by local computers that are not owned by the user or the organization 18.

Figure 2:
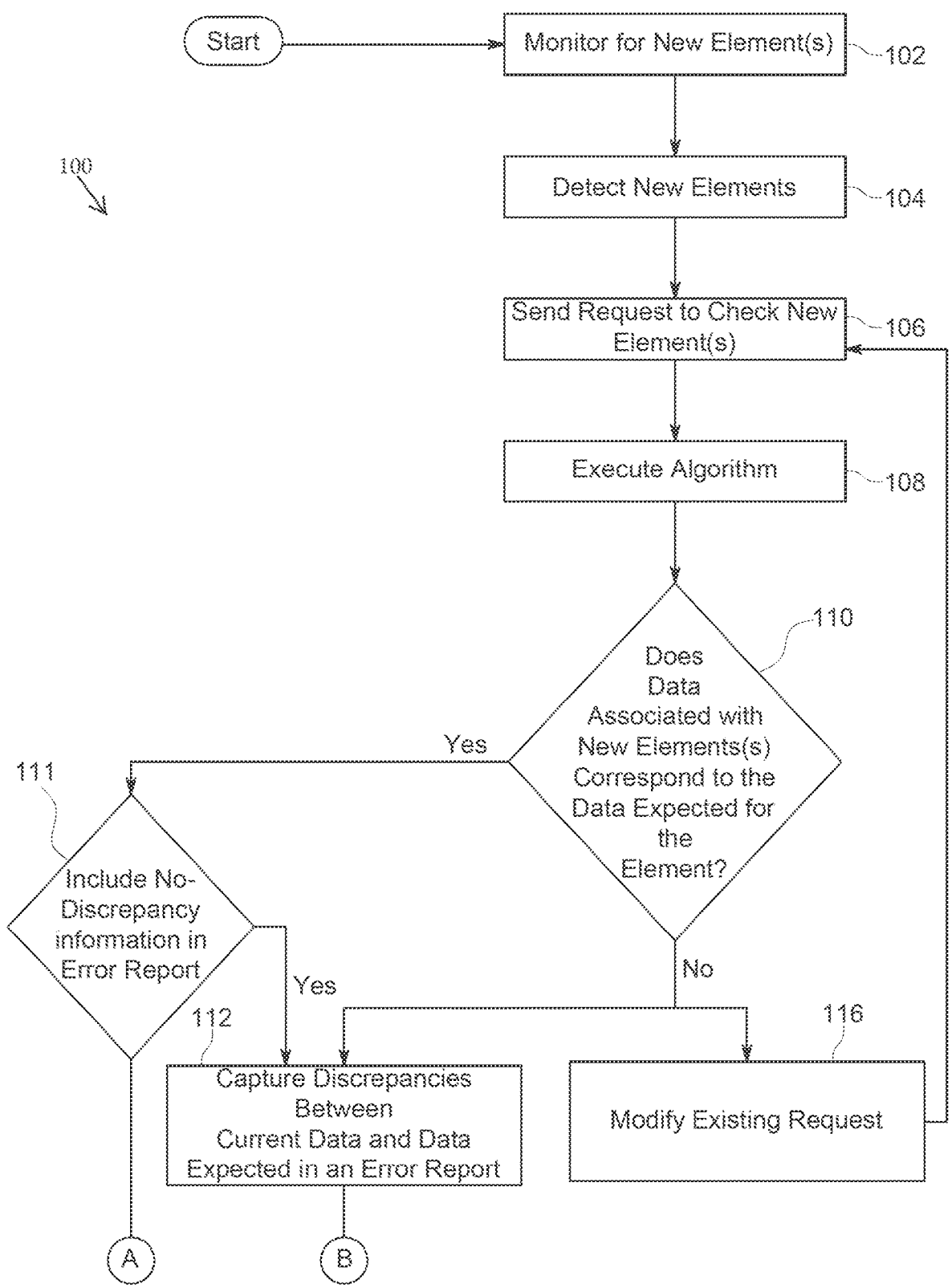
FIG. 2 is a flow chart of an embodiment of a method of validating data.
Figure 2:
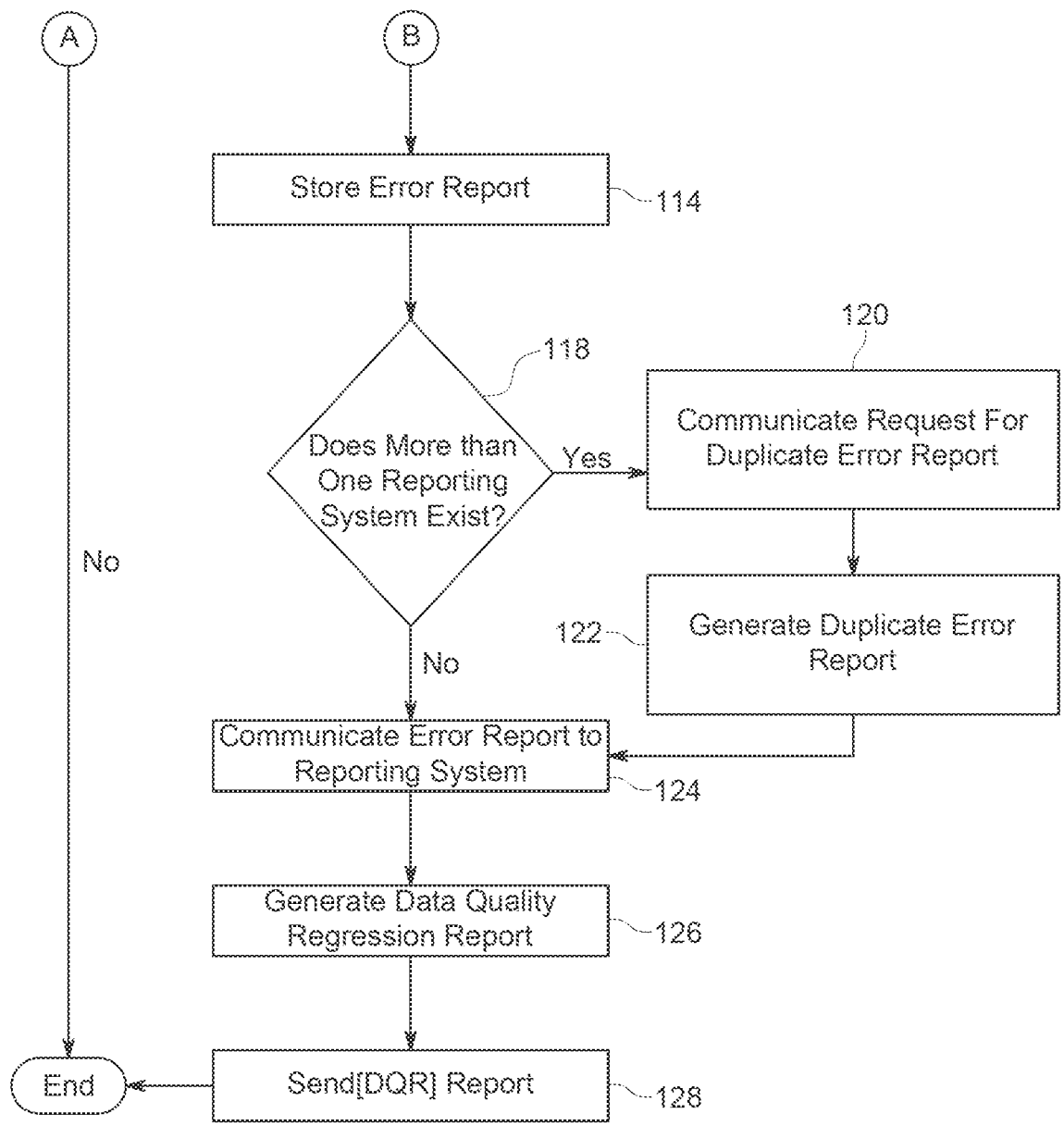

Turning to FIG. 2, a method of validating data 100 is shown. The QC algorithm 42 may include one or more of the method steps or instruction blocks, as described herein, employing and configuring the specialized user computing device 12. As described above, a user may access a digital touch point 16 of an organization using the specialized user computing device 12. Once the digital touch point 16 is launched, the QC algorithm 42 of the QA module 32 may begin monitoring the digital touch point 16 for the creation of new elements 36 at a block 102. At a block 104, the creation of a new element 36 may be detected by the QA module 32, and, in response, a request to call the new element 36 may be deployed by the QA module 32 at a block 106.

The new element 36 may be received by the QA module, and the QC algorithm 42 may be executed against the new element 36 at block 108. As discussed above, the algorithm 42 may determine at block 110 whether the current data 38 of the new element 36 matches or corresponds to the data expected for the element.

If there are no discrepancies between the current data 38 associated with the new element 36 and the expected data for the element, then the method may proceed to a block 111. At block 111, the system will determine whether information that no discrepancies exist will be included in an error report. If the no-discrepancy information is to be captured, the method will continue to block 112. If the no-discrepancy information is not to be captured, then the method will end and operation will continue normally without interruption or change.

If there are discrepancies between the current data 38 associated with the new element 36 and the data expected for the new element, at a block 112, the discrepancies may be captured in a tangible error report 44. The tangible error report 44 may be generated by the QA module 32 and may be stored to any system designated at install at a block 114.

The QA module 32 may also modify the existing request to call 40 at a block 116. As discussed above, the modifications implemented by the request may include changing of one or more aspects of the new element 36, creating a new element, or deleting the element 36.

At a block 118, the number of reporting systems 46 may be determined. If multiple reporting systems 46 exist, a request for one or more duplicate error reports may be created and communicated at block 120. One error report can be generated and sent to any number of reporting systems to satisfy the organization's needs without needing to run the QC algorithm 42 multiple times. At a block 112, the one or more duplicate tangible error reports 44a may be generated in response to the request.

At a block 124, the error report 44 and duplicate error reports 44a may be communicated to the appropriate reporting system(s) 46. The reporting system 46 then may process the error report 44 and may generate a DQR report 48 at block 128. As noted above, the DQR report 48 may include any errors in data collection as outlined by data concepts described herein. For example, the DQR report may include data from the document object module (DOM), visitor provided information (name, email address, etc.), behavioral data (data indicating web pages viewed, applications interacted with, links clicked, etc.), purchase data (data indicating items placed in cart, items purchased, etc.), campaign interactions (data indicating that the consumer came to website from email, by clicking on an ad on a third party website, etc.) or other types of consumer data as described herein.

The DQR report 48 may be sent to the organization 18 or a third party vendor 34 at a block 128. The DQR report 48 may be used by the organization 18 or third party vendor 34 to identify errors automatically without any manual effort and ultimately put a plan in place to triage and remedy errors as they come in based on the algorithm's prioritization.

By providing an actionable report and the ability to modify new elements in real-time, the system and methods disclosed herein enable IT and other personnel to fix errors immediately without having to diagnose and repair the cause. The system and methods disclosed herein may therefore save IT personnel 80% or more of the time they spend on quality assurance issues and the associated costs for that time and effort, especially across a combination of platforms and technologies.

It is noted that in some non-limiting embodiments, the method 100 shown in FIG. 2 may omit the steps illustrated at block 124 and 126 and 128 (as well as block 118 in some cases). Accordingly, the organization 18 may prefer that any report 44 not be sent to a third-party vendor 34 but rather only be sent back to organization 18 and/or stored by administrative entity 50. As discussed later below, the QA module 32 and QC algorithm 42 may be used to validate data from any type of digital touch point 16 and is not limited to websites that customers of organization 18 interact with. Further, the QA module 32 and QC algorithm 42 may be monitoring elements related to consumer and organization data 18 that are not in the form of tags or data packet. Additionally, there may be cases in which the QA module 32 and QC algorithm 42 is used to validate and correct issues with data that organization 18 does not want to share with an external third party (e.g., such as third party vendor 34) in which case the method in FIG. 2 may omit steps 118-128 and all information about the changes made by the QA module 32 and QC algorithm 42 or any detections made may be transmitted back to the organization 18. In some cases, there may be no anomalies or errors or discrepancies, and the organization 18 is provided with this feedback. FIG. 5 shows an example of such a system in which any external reporting is omitted.

FIGS. 3A-3F illustrates various example error reports 44 and duplicate error reports 44a that may be generated and sent to one or more reporting systems 46. The layout and information captured by the example error reports are for illustration purposes, and the error reports generated by the system are not limited to those shown in FIGS. 3A-3F. Further, the number and type of error report 44 generated may be customized based on the needs of the organization.

FIG. 3A shows an example error report directed to data layer errors. The data layer error report may capture discrepancies in element data and organize the error by type, such as incorrect formatting. FIG. 3B shows an example error report that may capture discrepancies in element data but organizes them by the page URL upon which the error is detected. FIG. 3C illustrates an example error report that may depict discrepancies in element data, by the tag name impacted. FIG. 3D demonstrates an example error report that may show the page URL upon which the element data errors were found for each tag name impacted. FIG. 3E demonstrates an example error report that may show the number of tags that were blocked due to discrepancies in element data. FIG. 3F shows an example error report that may display the tags blocked by the page URL upon which the element data error was detected.

Figure 4:
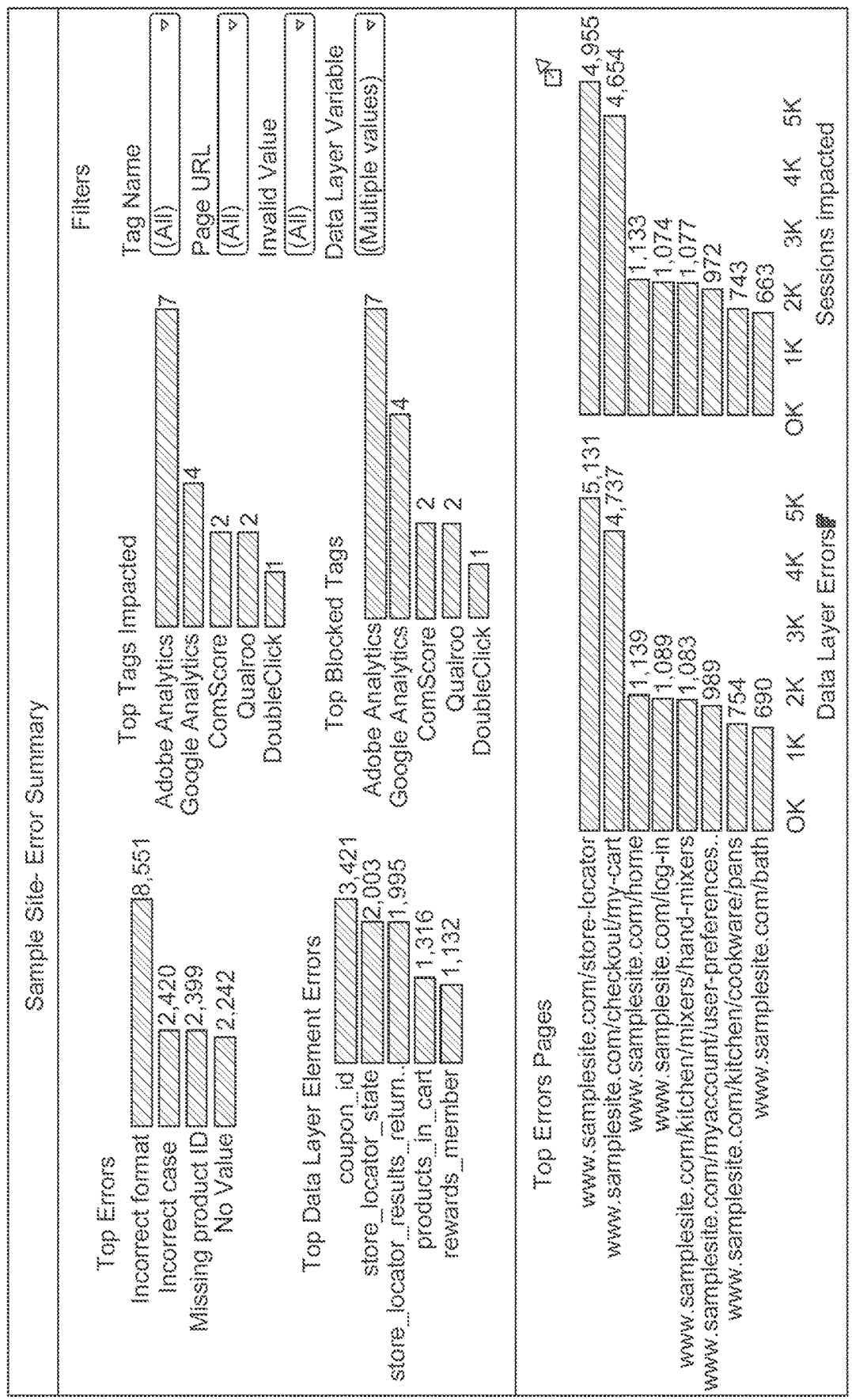
FIG. 4 illustrates an example error summary interface.

In addition to providing individual error reports, the system may also provide a summary report of the element data errors detected. The summary report may organize, rank, and graphically depict the number and type of errors detected. FIG. 4 shows an example summary report in which the summary report is presented digitally and enables the organization to filter the information presented in the error summary report as needed.

It is noted that the reporting examples shown in FIGS. 3A-4 are merely examples and that many different forms of display may be used to share information about what was done to the egressed data and if any errors, discrepancies, or anomalies were detected. Further, in some cases, the report 44 may not include columns and data charts. Rather, in one non-limiting embodiment, a report 44 may include an interactive graphical display that a user at the organization 18 or another party can continuously click on in order to be provided with more and more granular levels of information.

Further, the method and system may identify and correct a problem which did not even exist before widespread use of computers and networks. The ability to identify possibly corrupt or malicious data is of growing importance but did not even exist before the advent of computers and networks.

It is noted that the reports 44 and 44a created and shown in FIG. 1 and FIG. 1A may not be sent to the third party vendor 34 in every scenario containing information about what has occurred to the egressed information or consumer and company data 23. In some cases, reporting may be optional. For example, in some situations, the ingested consumer and company data 23 may be sensitive and contain sensitive information that the organization 23 does not want third party vendors 34 or other parties to see or have a full accounting of in detail. For example, and without limitation, in one scenario, organization 18 may be an energy company that is trying to make future predictions about the demand and capacity to provided electricity to regional markets. The organization 18 may combine information from various data sources to produce proprietary models that serve to assist decision makers to identify valuable trade opportunities. Examples of these utilized data sources may be regular regional weather reports or anticipated maintenance downtime for power plants. Each may be provided via some sort of electronic means such as an email, a "webhook" call, or it may simply be posted to a website somewhere and the company may utilize some sort of "web scraper" technology to convert the information to a more easily machine parsed format. Because of the opportunity for errors in the posting of this information and the potential for invalid data to corrupt the model utilized by decision makers of organization 18, the QA module 32 and QC algorithm 42 may be able to validate the data captured by these ingested data sources to validate that it conforms to operational constraints and requirements prior to ingestion, or otherwise modify the data to apply any necessary changes to achieve appropriate constraint compliance.

Accordingly, in some embodiments, the administrative entity 50, as shown in FIG. 1, may act as an interceptor or middle party that intercepts the egressed information before a report is created. The administrative entity 50 may, in some cases, send a modified report containing non-sensitive, non-proprietary information to a third party vendor 34 or other party. In other cases, the administrative entity 50 may block any third-party reporting from occurring and ensure that any correction of anomalous or erroneous values for the consumer and company data 23 on the digital touch point 12 actually occurs. In the example noted above, in which the organization 18 is an energy company, the organization 18 may want to see some amount of reporting to verify that the QC module 32 and QC algorithm 42 is preventing invalid data from seeping into their model used to make decisions about the energy market and future demand, but the organization 18 may not want a same level of detail in the reporting of this kind of data used internally as if the digital touch point 16 is a publicly used website that is accessed by the organization's 18 customers. In the example noted above in which organization 18 is an energy company, the digital touch point(s) 16 may be internal data systems or data sources that provide the information that the QC module 32 and QC algorithm 42 validate on behalf of organization 18.

FIG. 5 shows an example in which the QA module 32 and QA algorithm 42 validate any data according to any rules or verification desired by the organization 18 and return a data summary report 502 to the organization 18. In FIG. 5, there is no external reporting to a third party vendor 34 as shown in FIG. 1. Instead, the organization 18 may desire that some element of the organization data 504 be checked for accuracy and validation. Organization data 504 may include consumer and organization data 23 as shown in FIG. 1 and FIG. 1A but may also include non-consumer related data. Further, organization data 50 may include archived data or data files. The Quality Assurance system 500 is provided by the administrative entity 50 and includes a QA module 32 and QC algorithm 42 as noted above. After detecting any issues with the organization data 504 and/or correcting and modifying the organization data 504, data summary report 502 may be forwarded to the organization 18 and/or administrative entity 50 for further recordkeeping and analysis.

Accordingly, there are multiple scenarios and applications in which the QA Module 32 and QC algorithm 42 may be applied whether the digital touch point 16 is a website sending information over the internet or whether another data system is used to egress information through any kind of digital touchpoint 16 on behalf of organization 18. The QA module 32 and QC algorithm 32 may be used regardless of whether the digital touch point 16 is a website or not. Rather, one of the many benefits of the QA module 32 and QC algorithm 42 is that anomalous or erroneous data presented and/or processed by the digital touch point 16 can be intercepted before being egressed or sent to any other system (whether external to the organization 18 or not) and the QC module 32 and QC algorithm 42 may act in the same way noted above in FIG. 1 and FIG. 1A, in which the QA module 32 and QC algorithm 42 may detect anomalies, errors, discrepancies and may modify these anomalies, errors, discrepancies based on pre-provided rules from a human developer or autonomous machine learning type models.

It is noted that the QA system 500 shown in FIG. 5 may be used to correct historical data using the QC algorithm 42, via the QA module. In one-non-limiting embodiment, a processor-implemented method for correcting historical data (i.e., organization data 504) for an organization 18 may include obtaining archived data or files of the organization 18, detecting using the QC algorithm 42 one or more discrepancies in the archived data or files of the organization 18. The QC algorithm 42 is customizable based on inputs provided by the organization 18 for correcting the historical data to satisfy a new condition or rule. The process may further include executing the QC algorithm 42 associated with the QA module 32 against the archived data or files. The process may further include modifying, via the QA module 32, the archived data or files, whereby modifying the archived data or files further comprises changing or replacing current data associated with the archived data or files or deleting elements of the current data in order to satisfy a new condition or rule. In some cases, new data or data packets may also be created to modify the archived data or files to satisfy a new condition or rule. The process for correcting archived data and data packets with historical information (e.g., an example of organization data 504) generating a report with a summary of any modifications made to the archived data or files. The processor-implemented method may further include transmitting the report to a third party vendor for further processing and analysis. The processor-implemented method may further include transmitting the report to the organization 18.

As noted above, the system described in FIGS. 1-4 described a system in which a first party or third party attempts to egress data from a digital touchpoint, such as digital touchpoint 16 shown in FIG. 1 and FIG. 1A. The QA algorithm 42 of the QA module 32 performs a number of unique functions. First, the QA algorithm 42 of the QA module 32 intercepts this data and detects any errors or anomalies or discrepancies whereby the QA module 32 automatically detects one or more discrepancies related to element data for the new element 36 by monitoring tags or other data packets embedded on the digital touch point 16 related to the new element 36 as the user browses and interacts with the digital touch point 16. In particular, the QA algorithm 42 associated with the QA module 32 is executed against the new element 36 to determine if one or more discrepancies or anomalies exist between current data 38 for the new element 36 and the expected data for the new element 36. The QC algorithm 42 is, advantageously, customizable by either the organization 18 or another party, including, but not limited to, the administrative entity 50 of the QC algorithm 42 and QC module 32. The administrative entity 50 can play a key role in modifying and/or training the QC algorithm 42 and QC module 32 to detect new anomalies, discrepancies, and errors as identified over a period of time by continuous monitoring of the digital touch point 16 by the QC module 32.

It is noted in some embodiments the QC algorithm 42 and QC module 32 can implement its detection and data validation including modifications or corrections on the systems associated with administrative entity 50 rather than the user computing device 12 or organization's 18 computing devices or data infrastructure system 22. This may reduce any load and consumption of resources by implementing the data validation rules on the servers, computing devices, and other systems associated with administrative entity 50. Any reports 44 or other information about data may be then transmitted to either a third party vendor 34 or back to the organization 18 for analysis and processing so that organization 18 may use this information to improve the presentation and operation of various elements of digital touch point 16 and/or make important decisions regarding the operation of organization 18.

Advantageously, the QC algorithm 42 and QC module 32 can intercept any data egressed by the digital touch point 16 and determine whether any remediation or modification steps need to be taken against this data (via detection) to transform this egressed data (via modification) or change where the egressed data is being sent. The ability to detect, remediate, and/or modify is supplied by the control software that is provided in the form of the QC algorithm 42 and QC module 32 which uses rules and conditions embedded into the QC algorithm 42 and QC module 32 as either authored by the administrative entity 50 or organization 18 or a combination of both parties, and that is then published to the digital touch point 16 (e.g., a web site). Once execution of all applicable rules completes, the potentially updated data is either blocked or allowed to proceed to the original destination (e.g., to the third party vendors 34 and/or organization 18). Simultaneously, the QC algorithm 42 and/or QC module 32 may also send information about what rules were ran and applied and the latest state of the information transmitted in a report or another type of summary that can be provided to the organization 18.

In some non-limiting embodiments, the organization 18 may be described as a first party. The first party is typically the party that may control a website or digital touch point 16 and may host all the code and run it on its own on the data infrastructure 22. The digital touch point 16 may also utilize third-party code provided by a third party provider, such as third party vendor 34. An example of such code may be GOOGLE ANALYTICS. Regardless of whether the first party (e.g., organization 18) or the third party (e.g., third party vendor 34) owns the consumer and organization data 23 or any information or who is responsible for any implemented logic or who is responsible for the reporting or analysis that is ultimately performed on the consumer and organization data 23, the QC algorithm 42 and QC assurance module 32 may still be implemented in the manner described throughout the present description.

Further, it is noted that QC module 32 and QC algorithm may be used for any type of data correction and validation, whether from one system to another or from a first party (e.g., organization 18) to a third party (e.g., third party vendor 34) or for within data analysis and review by a first party (e.g., internally within organization 18's systems).

Further, it is noted that the detection and or modification of errors, anomalies, and discrepancies (e.g., as shown in FIG. 2 in blocks 104-116), may be provided by a human developer who has specified certain rules and parameters used by the QC algorithm 42 and the QC assurance module 32 to detect and compare the current data as emitted in data request from the digital touch point 16 with the expected data. Additionally, the QC algorithm 42 and QC assurance module 32 may utilize artificial intelligence and machine learning to detect errors, anomalies, and discrepancies and to execute the QC algorithm 42 and QC assurance module 32 to take remedial action, including all the possible remedial actions just described (e.g., detect and report only, or correct by deleting or otherwise modifying and report). Accordingly, under an artificial intelligence/machine learning based system, the detection and execution and modification steps may combine rules developed by a human developer with the artificial intelligence/machine learning based models that can use additional context and training in order to detect errors and apply remedial corrective action to the errors if so specified. The models can use historical data to look for any sort of pattern so that the rule could be artificially defined based on a calculated baseline to complement the original human provided rules and can be implemented as part of the detection steps of the method and system 10 (e.g., detection 104 in FIG. 2). Further, the artificial intelligence/machine learning/model based system can also be automatically used in the execution step (e.g., execution of the QC algorithm 42 shown in step 108 in FIG. 2) to implement changes.

For example, the digital touch point 16 may egress information to a third party vendor 34, which uses or offers GOOGLE ANALYTICS, and which may capture and collect information about a total sale. GOOGLE ANALYTICS may have a rule that the currency symbol "$" should not be sent in the emitted data from the digital touch point 16. If the digital touch point 16 is currently configured to capture "$4.55" and send this as the total value for a sale from digital touch point 16 with the currency symbol "$", under a machine learning/artificial intelligence/model based system, no specific rule may have been provided by a human developer to identify and to possibly delete the currency symbol "$" before emitting the total value of the sale as "4.55," but the machine learning/artificial intelligence/model based system may have been trained to identify or detect the currency symbol $ and when executing the QC algorithm 42, may be able to take remedial action, including deleting the currency symbol $ before the data is included in a set of emitted data sent to the third party vendor 34 i.e. GOOGLE ANALYTICS or the organization 18 that will use this data in making important determinations about the organization 18 based on what is reported about total sales made to users using the digital touch point 16.

Further, even if rules are initially developed by a human developer and/or supplemented with artificial intelligence/machine learning models, in some instances, any captured consumer and organization data 23 emitted in a data request may first be sent to another party for detection purposes in order to make a determination as to which rules should be applied. Accordingly, an outbound request to a third party vendor 34 may be intercepted and sent back to the organization 18 (e.g., first party) and/or to an administrative entity 50 who may determine which rule to execute. A report detailing the identification and performed rules may be provided and sent to organization 18 and to a collection system kept by administrative entity 50 in one non-limiting embodiment. The intercepted outbound data request may then be forwarded or emitted to the third party vendor 34 (e.g., GOOGLE ANALYTICS) with the correct or specifically selected rules already applied to the consumer and organization data 23. A further variation of this embodiment would include the identification and detection of errors, anomalies, or discrepancies or of a creation of a new element 36, but to leave the modification/remediation steps (e.g., steps 112 and 116 shown in FIG. 2) to a first party, such as the organization 18, or a third party, such as either the administrative entity 50 or a third party vendor 34, to perform. The first party or third party may return the processed data after having implemented modification/remediation steps to emit to a third-party vendor 34 (e.g. GOOGLE ANALYTICS) as further rules dictate.

It is noted that there may be scenarios in which a tangible error report is not sent back to organization 18 or third party vendor 34. Rather, the QA module 32 and QC algorithm 42 validates the data from the digital touch point 16 according to a predetermined set of rules or baseline, and any modifications may be made as needed to the emitted data. The concluding format after the modifications are made and the errors, anomalies, and discrepancies are detected is instead only sent to the administrative entity 50 and stored in a confidential and protective manner so that the organization's 18 company and consumer data 23 (or any other kind of data egressed from digital touch point 16) is not exposed to any other party except the administrative entity's 50 system. Once received by the administrative entity 50, if needed, any modified or corrected data may be emitted to the appropriate intended parties with any confidential information left out and not made visible to the customer or other third party. Advantageously, this also helps use less bandwidth and site performance on the organization 18 because the data is emitted by the administrative entity 50.

Another implementation or application for use of the system outlined in FIG. 1 and FIG. 1A and FIG. 5 for the QA module 32 and QC algorithm 42 is to validate and ensure that historical data is correctly migrated from one system to another and incorporated into the updated system. Accordingly, data persistence and service migration may be an application in which QA module 32 and QC algorithm 42 is useful to validate that transferred data (e.g., consumer and organization data 23) is transferred in a manner so as not to incorporate errors, anomalies, and discrepancies. In a non-limiting example, there may be a scenario where an organization 18 is migrating from GOOGLE ANALYTICS (one example of a third party vendor 34) to ADOBE ANALYTICS (another example of a third party vendor 34). Typically, this would mean the creation of an ADOBE ANALYTICS account devoid of any GOOGLE ANALYTICS data. Because the QA module 32 and the QC algorithm 42 is intercepting each of the requests and reporting on their final state, it is possible that the stored reported data can be replayed back into an alternative service, with the values reformatted to accommodate such a migration so that historical data can be ingested as though it has always existed in the account, even if the historical data was originally collected elsewhere. Accordingly, any request for the data emitted from the organization 18's digital touch point 16 may intercepted by the QA module 32 and QC algorithm 42 which will make sure alternative set of rules matching the specifications of ADOBE ANALYTICS is applied to the data so that the data conforms to the format required by the target service (in this case ADOBE ANALYTICS) and is emitted to an endpoint specified by the organization 18 (e.g., such as a to a file to be ingested by ADOBE ANALYTICS or into a network-based endpoint for more routine ingestion).

It is noted that the QA system 500 shown in FIG. 5 may be used to correct historical data using the QC algorithm 42, via the QA module. In one-non-limiting embodiment, a processor-implemented method for correcting historical data (i.e., organization data 504) for an organization 18 may include obtaining archived data or files of the organization 18, detecting using the QC algorithm 42 one or more discrepancies in the archived data or files of the organization 18. The QC algorithm 42 is customizable based on inputs provided by the organization 18 for correcting the historical data to satisfy a new condition or rule. The process may further include executing the QC algorithm 42 associated with the QA module 32 against the archived data or files. The process may further include modifying, via the QA module 32, the archived data or files, whereby modifying the archived data or files further comprises changing or replacing current data associated with the archived data or files or deleting elements of the current data in order to satisfy a new condition or rule. In some cases, new data or data packets may also be created to modify the archived data or files to satisfy a new condition or rule. The process for correcting archived data and data packets with historical information (e.g., an example of organization data 504) generating a report with a summary of any modifications made to the archived data or files. The processor-implemented method may further include transmitting the report to a third party vendor for further processing and analysis. The processor-implemented method may further include transmitting the report to the organization 18.

A variation of the example above would allow for adaptation to new legal requirements and compliance rules regarding what sort of information is deemed particularly sensitive or not over a period of time. As part of the original data migration effort, new rules about personally-identifiable information (PII) can be created that further filter out newly identified PII from the archival data further ensuring compliance. For example purposes only, in one scenario, Europe may pass some new rules that indicates that email addresses are too identifying and must not be stored in historical data. An organization 18 may utilize email addresses throughout its data analytics solution, but they may need some way to remove them due to this new rule that email addresses should not be included in historical data. The organization 18 may use QA module 32 addresses cannot be included in historical data. Third party vendors 34 such as GOOGLE ANALYTICS and ADOBE ANALYTICS may only allow data to be processed in their systems a single time upon ingress, so there is no simple way to reprocess everything with their system. Rather, the organization 18 may instead create a new GOOGLE ANALYTICS and/or ADOBE ANALYTICS property and use QC module 32 and QC algorithm 42 archival system to replay the originally captured data back into the new property. Thus, the QC module 32 and QC algorithm 42 may apply the older and updated PII rules to the data as it runs to for example, replace all of the email addresses with a symbol or another non-email address variable or value (e.g., a hash tag), thereby ensuring compliances, but retaining data associations.

One of ordinary skill in the art may envision may other uses and implementations of the QA module 32 and QC algorithm 42.

The specialized user computing devices, computers, and servers described herein may communicate via networks, including the Internet, WAN, LAN, Wi-Fi, other computer networks (now known or invented in the future), and/or any combination of the foregoing. It should be understood by those of ordinary skill in the art having the present specification, drawings, and claims before them that networks may connect the various components over any combination of wired and wireless conduits, including copper, fiber optic, microwaves, and other forms of radio frequency, electrical, and/or optical communication techniques. It should also be understood that any network may be connected to any other network in a different manner. The interconnections between computers and servers in system are examples. Any device described herein may communicate with any other device via one or more networks.

The example embodiments may include additional devices and networks beyond those shown. Further, the functionality described as being performed by one device may be distributed and performed by two or more devices. Multiple devices may also be combined into a single device, which may perform the functionality of the combined devices.

The various participants and elements described herein may operate one or more computer apparatuses to facilitate the functions described herein. Any of the elements in the above-described Figures, including any servers, user devices, or databases, may use any suitable number of subsystems to facilitate the functions described herein.

Any of the software components or functions described in this application, may be implemented as software code or computer readable instructions that may be executed by at least one processor using any suitable computer language such as, for example, Java, C++, or Perl using, for example, convention or object-oriented techniques.

The software code may be stored as a series of instructions or commands on a non-transitory computer readable medium, such as a random access memory (RAM, a read only memory (ROM), a magnetic medium such as a hard-drive or a floppy disk, or an optical medium such as a CD-ROM. Any such computer readable medium may reside on or within a single computational apparatus and may be present on or within different computational apparatuses within a system or network.

It may be understood that the present invention as described above can be implemented in the form of control logic using computer software in a modular or integrated manner. Based on the disclosure and teachings provided herein, a person of ordinary skill in the art may know and appreciate other ways and/or methods to implement the present invention using hardware, software, or a combination of hardware and software.

The above description is illustrative and not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention. A recitation of "a", "an", or "the" is intended to mean "one or more" unless specifically indicated to the contrary. Recitation of "and/or" is intended to represent the most inclusive sense of the term unless specifically indicated to the contrary.

One or more of the elements of the present system may be claimed as means for accomplishing a particular function. Where such means-plus-function elements are used to describe certain elements of a claimed system, it will be understood by those of ordinary skill in the art having the present specification, figures, and claims before them, that the corresponding structure is a general purpose computer, processor, or microprocessor (as the case may be) programmed to perform the particularly recited function using functionality found in any general purpose computer without special programming and/or by implementing one or more algorithms to achieve the recited functionality. As would be understood by those of ordinary skill in the art that algorithm may be expressed within this disclosure as a mathematical formula, a flow chart, a narrative, and/or in any other manner that provided sufficient structure for those of ordinary skill in the art to implement the recited process and its equivalents.

While the present disclosure may be embodied in many different forms, the drawings and discussion are presented with the understanding that the present disclosure is an exemplification of the principles of one or more inventions and is not intended to limit any of the inventions to the embodiments illustrated. The attached Appendix may provide more detail regarding the operation of a payment system.

The present disclosure provides a solution to the long-felt need described above. In particular, the systems and methods described herein may be configured for improving consumer data collection systems and tangible reporting of consumer data to organizations. Further, advantages and modifications of the above-described system and method will readily occur to those skilled in the art. The disclosure, in its broadest aspects, is therefore not limited to the specific details, representative system and methods, and illustrative examples shown and described above. Various modifications and variations can be made to the above specification without departing from the scope or spirt of the present disclosure, and it is intended that the present disclosure covers all such modifications and variations provided that they come within the scope of the following claims and their equivalents.

What is claimed is:

1. A system for validating consumer and organization data for a new element on a digital touch point associated with an organization, comprising:
    a memory; and
    a processor disposed in communication with said memory, and configured to execute a plurality of processing instructions stored in the memory, wherein the processor executes instructions to:
    actively monitor in real time, via a quality assurance (QA) module, the digital touch point associated with the organization as a user browses and interacts with the digital touch point, wherein the QA module validates the consumer and organization data in order to prevent errors related to the consumer and organization data as represented on the digital touch point being sent to vendors, wherein the vendors collect and process the consumer and organization data for the digital touch point;
    detect, via the QA module, the creation of the new element on the digital touchpoint, wherein the QA module automatically detects one or more discrepancies related to element data for the new element by monitoring tags embedded on the digital touch point related to the new element as the user browses and interacts with the digital touch point; and
    execute a quality control (QC) algorithm associated with the QA module on a user computing device against the new element to determine if the one or more discrepancies exist between current data for the new element and expected data for the new element, wherein the QC algorithm is customizable based on inputs and parameters provided by the organization and artificial intelligence/machine learning based models.

2. The system of claim 1, further comprising:
    modify, via the QA module, the current data for the new element in real-time to eliminate the one or more discrepancies on the digital touch point associated with the organization, wherein modifying via the QA module further comprises changing the current data associated with the new element, creating another new element, or deleting the new element.

3. The system of claim 1, further comprising:
    generate, via the QA module, a tangible error report in response to the QC algorithm determining that discrepancies exist between the current data for the new element and the expected data for the new element, wherein the tangible error report captures the one or more discrepancies between the current data received and the expected.

4. The system of claim 3, wherein the QA module communicates the tangible error report to an administrative entity.

5. The system of claim 3, wherein the QA module communicates the tangible error report to a third party.

6. The system of claim 5, wherein the third party processes the tangible error report and generates a data quality regression (DQR) report, wherein the DQR report includes information regarding the one or more discrepancies and other requested information that was incorporated into the customizable QC algorithm.

7. The system of claim 1, wherein the artificial intelligence/machine learning based models train the QC algorithm to detect the one or more discrepancies that are additional to the inputs and parameters provided by the organization.

8. The system of claim 1, wherein the tangible error report is modified to remove sensitive or proprietary information or any other type of information specified by the organization to be removed and then sent to the third party vendor.

9. The system of claim 1, wherein the vendors collect the consumer and organization data and analyzes the consumer and organization data in order to provide valuable reports for the organization regarding the digital touchpoint.

10. A processor-implemented method for validating organization data and data packets for an organization, comprising the steps of:
    actively monitoring in real time, via a quality assurance (QA) module, a digital touch point associated with the organization, wherein the QA module validates the organization data and data packets for accuracy and to prevent anomalies on the digital touchpoint;
    detecting, via the quality assurance (QA) module, one or more discrepancies or anomalies on the digital touchpoint in the organization data and data packets;
    executing a quality control (QC) algorithm against the one or more discrepancies or anomalies on the digital touchpoint, wherein the QC algorithm is associated with the QA module and customizable based on inputs provided by the organization, wherein the QC algorithm is executed based on artificial intelligence/machine learning based models, wherein the artificial intelligence/machine learning based models train the QC algorithm to detect the one or more discrepancies or anomalies in the organization data and the data packets that are additional to the inputs and parameters provided by the organization;

generating, via the QA module, a data report that captures the one or more discrepancies or anomalies; and communicating, via the QA module, the data report to the organization.

11. The processor-implemented method of claim 10, further comprising, modifying, via the QA module, the one or more discrepancies or anomalies, wherein modifying via the QA module further comprises changing a value or other content for the data and data packets to correct the data and data packet or deleting a value or other content for the data and data packets or creating new values for the data and data packets.

12. The processor-implemented method of claim 10, wherein the QC algorithm is executed based on the artificial intelligence/machine learning based models or based on human provided training.

13. The processor-implemented method of claim 10, further comprising, in response to a determination when the copy of the data report is communicated to the organization, transmitting a copy of the data report to the administrative entity.

\* \* \* \* \*